STRIP TRANSMISSION LINE TERMINATION DEVICE

Filed Dec. 1, 1966 2 Sheets-Sheet 1

INVENTOR
ROBERT W. MORTON
BY Edgar O. Rost
ATTORNEY

April 28, 1970 R. W. MORTON 3,509,495

STRIP TRANSMISSION LINE TERMINATION DEVICE

Filed Dec. 1, 1966 2 Sheets-Sheet 2

INVENTOR
ROBERT W. MORTON

BY Edgar O. Rost

ATTORNEY 3,509,495

STRIP TRANSMISSION LINE TERMINATION DEVICE

Robert W. Morton, Lewiston, Maine, assignor to Raytheon Company, Lexington, Mass., a corporation of Delaware Filed Dec. 1, 1966, Ser. No. 598,293
Int. Cl. H01p *1/26, 1/22*
U.S. Cl. 333—22 3 Claims

ABSTRACT OF THE DISCLOSURE

A strip transmission line termination load device comprising a conductor defining a spiral path of reducing dimensions about a fixed reference plane with energy absorbing means disposed in contact with the conductor to expose progressively increasing amounts of the absorbing means to the energy propagated along the conductor. The spiral conductor may be of a uniform cross section or gradually tapered to meet the required electrical characteristics.

The present invention relates generally to microwave transmission lines and more particularly to a termination device for such lines having a strip planar conductor configuration.

A transmission line for the propagation of electromagnetic energy in the microwave region of the spectrum which has found wide acceptance in recent years is referred to as strip transmission line. Such propagating means comprise at least one planar electrical conductor which is grounded and commonly referred to as the ground plane conductor. A narrow elongated ribbon-like strip of a conductive material is spaced from the ground plane conductor by dielectric means and electromagnetic energy is propagated conventionally in the transverse electric and magnetic field mode between the two planar conductors. The ground plane electrical conductor is of a wider dimension than the strip conductor. A two-line electrical transmission circuit is thereby provided capable of handling low to intermediate RF power levels. Essentially all microwave components commonly provided in the hollow rectangular pipe waveguide configuration have now been adapted to such strip transmission lines. Utilizing known printed circuit techniques, metallic clad sheets of such materials as Fiberglas or Teflon, as well as those selected from the phenolic or polystyrene group, have the strip conductor configuration deposited on a planar surface to provide the desired microwave transmission circuitry. Complete RF head assemblies, gyrators, rotators, circulators and duplexers, as well as attenuators, have now become well known in the art. The strip transmission line concept has afforded circuit designers with a useful tool in the miniaturization of microwave component packaging with accompanying reductions in cost as well as weight.

A necessary component of all microwave transmission lines is a means for the dissipation and absorption of the transmitted energy where necessary. It is a fundamental requirement of such energy absorption means that no unwanted or adverse reflections of energy be set up by the termination structure. Another requirement is that the termination means be sufficiently broadbanded to comply with the desired transmission characteristics of the system utilizing microwave energy.

In addition to the foregoing strip transmission line configuration which comprises a single ground plane conductor another configuration found in common usage includes two parallel disposed outer ground plane conductors with a center strip conductor intermediately disposed therebetween and separated therefrom by dielectric means. This configuration is essentially akin to coaxial transmission waveguides and is differentiated primarily by the flat coplanar configuration.

It is a primary object of the present invention to provide a new and novel strip transmission line termination device.

A further object of the present invention is the provision of a new and novel strip transmission line termination device having electromagnetic energy absorption means which is efficiently matched in impedance characteristics over a wide range of microwave frequencies.

Still another object of the present invention is the provision of a strip transmission line termination device of relatively short over-all length relative to prior art devices employed for a similar purpose.

In accordance with the teachings of the invention and one illustrative embodiment thereof the center strip conductor of the transmission line configuration having two parallel outer ground plane conductors is provided adjacent to its terminal end with a spiral path having a reducing radius about a fixed reference axis. Energy absorption means of a resistive material contact opposing planar surfaces of the strip conductor over substantially all the area defined by the spiral path. The absorption means are thereby exposed to the energy propagating along the strip conductor in a progressively increasing amount by means of the overlapping of the spiral turns by the dissipative load resistive material. The geometry of the spiraled termination of the strip conductor may be provided with a uniform width or a gradually tapering width to further enhance the loss characteristics of the over-all device.

Prior art termination devices are conventionally of a straight configuration comprising a tapered resistive member such as a carbon coated card and therefore structures of rather cumbersome lengths have evolved to handle most of the power levels where such strip transmission lines are employed. Additionally, elaborate matching transformer structures are oftentimes required to match the impedances of the termination load to those of the transmission line. The advantages of the spiral strip conductor termination device in further miniaturizing strip transmission line components will therefore be readily apparent. It may also be noted that the spiral strip conductor configuration has substantially eliminated the need for impedance transformation and matching structures.

Other objects, features and advantages will be readily evident to those skilled in the art after consideration of the following detailed description and reference to the accompanying drawings, in which.

Figure 1:
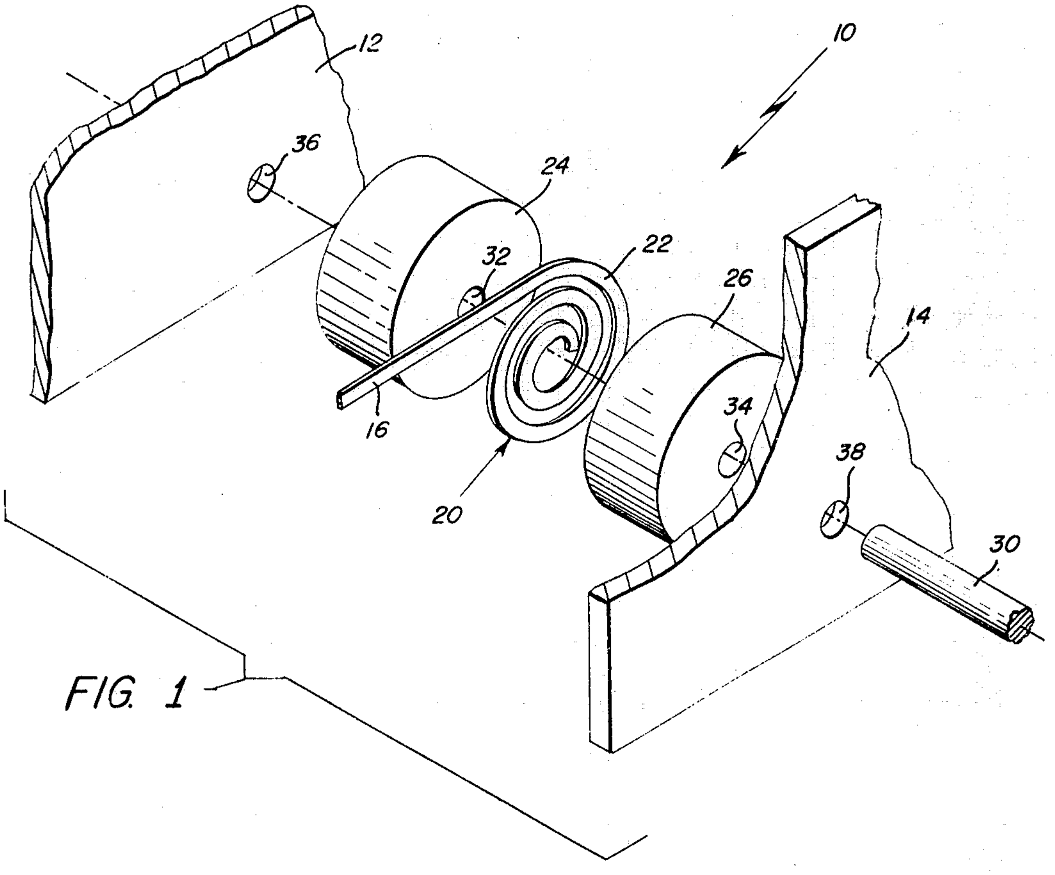
FIG. 1 is an exploded view of an illustrative embodiment of the invention.
Figure 2:
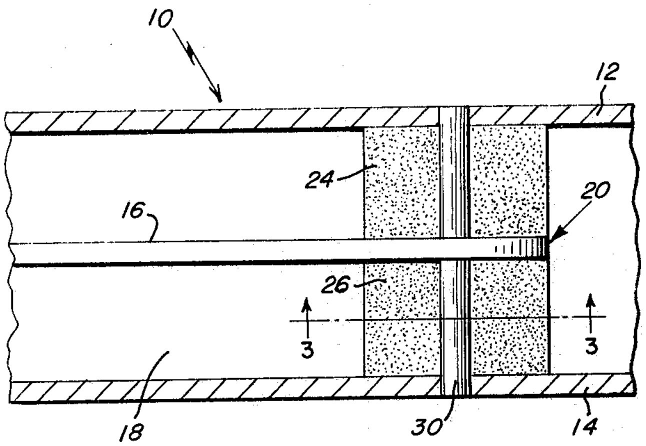
FIG. 2 is a partial vertical cross-sectional view of the illustrative embodiment.
Figure 3:
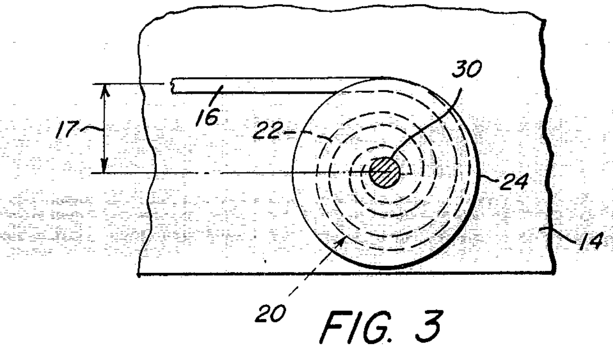
FIG. 3 is a cross-sectional view along the line 3—3 in FIG. 2.

With reference now to FIGS. 1, 2 and 3, the termination device 10 is of the strip transmission line type having a pair of outer ground plane conductors 12 and 14. Any suitable electrically conductive material such as copper may be selected for conductors 12 and 14. A narrow elongated center strip conductor 16 is disposed coextensively with outer conductors 12 and 14 and is spaced therefrom by means of any dielectric material such as Teflon, Rexolite, alumina, titanium oxide or any other material having a high dielectric constant. In the illustrative embodiment an air space 18 and dielectric spacers (not shown) would be utilized to achieve the appropriate spacing. Center strip conductor 16 is also fabricated of a material having a high electrical conductivity such as copper.

Center strip conductor 16 is now terminated in a spiral portion indicated generally by 20. Each of the concentric spaced turns 22 defining the spiral path has a gradually reducing radius about a fixed reference axis which is offset from the center line of conductor 16 as indicated by 17. The over-all length of the spiral portion is selected in accordance with the desired loss characteristics of the termination device. In the majority of the microwave applications the mean length of the spiral path is desirably two free space wavelengths or greater in length. In the embodiment shown in FIGS. 1–3 the width of the center strip conductor has been maintained uniform including the turns of the spiral portion 20. Energy absorbing means comprising two cylindrical dissipative disc members 24 and 26 contact and completely encompass the area defined by the spiral portion 20 in such a manner that a progressively increasing amount of the spiral conductor section is overlapped by the energy absorbing members. Members 24 and 26 are thereby disposed in contact with opposing planar surfaces of the center conductor and the outer ground plane members 12 and 14. Desirably, a lossy material for the dissipative member having a high electical resistance, such as for example materials selected from the iron and carbon group, is employed for members 24 and 26. The mean length of the spiral path then will be measured from the point of initial contact with the resistive absorbing means to the terminal end of the strip conductor 16.

To aid in the alignment of the spiral portion and dissipative members a locating pin member 30 is introduced through an axial passageway 32 and 34 in the respective loading discs as well as the center of the spiral section 20. The outer ends of locating pin member 30 are seated within aperture 36 and 38 provided in the respective parallel outer ground plane conductors 12 and 14.

Figure 4:
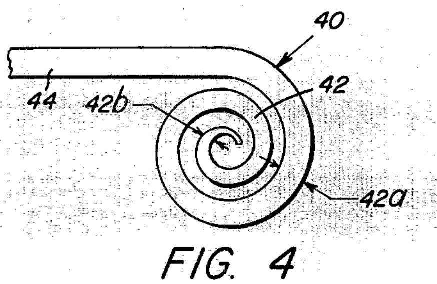
FIG. 4 is a perspective view of a modified component of the embodiment.

In accordance with another feature of the invention, reference being directed to FIG. 4, a spiral portion 40 is provided with a plurality of concentric turns 42 of gradually reducing radius. In this embodiment the width of a center strip conductor 44 is gradually tapered from a point indicated by arrows **42*a* to a point indicated by arrows 42*b***. The contact area between the spiral conductor and the dissipative load means will be encompassed similarly by the absorbing means as shown in the previous illustrations.

Figure 5:
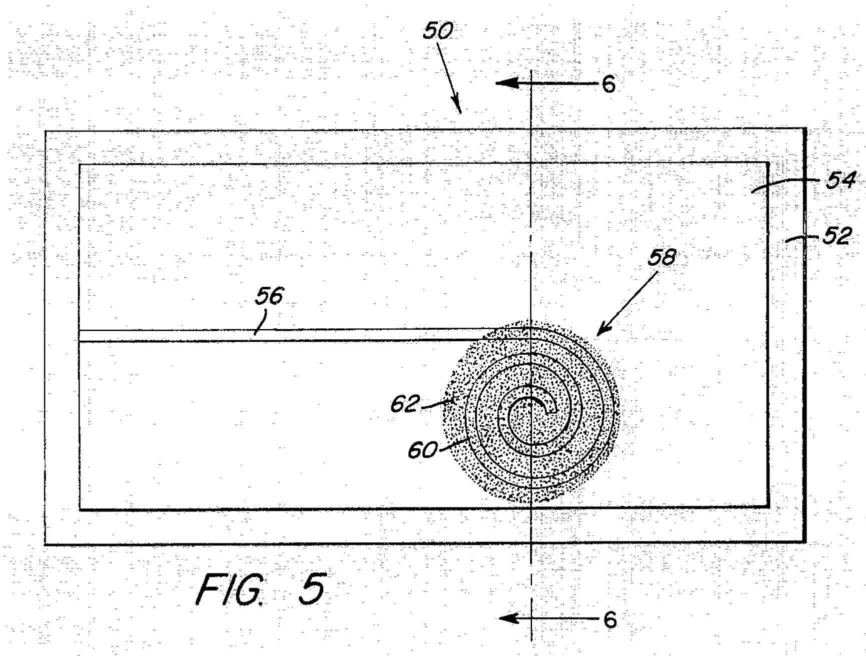
FIG. 5 is a plan view of the illustrative embodiment of the invention in a single ground plane conductor strip transmission line configuration.
Figure 6:
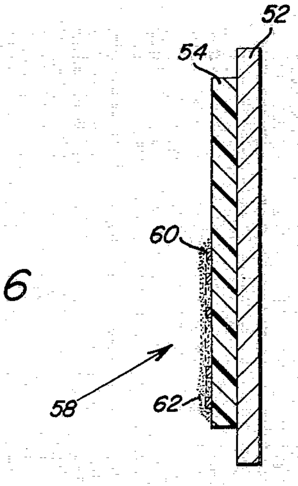
FIG. 6 is a cross-sectional view along the line 6—6 in FIG. 5.

Turning next to FIGS. 5 and 6, an embodiment of the invention in the single ground plane conductor configuration is shown and indicated generally 50. A relatively wide ground plane conductor 52 supports a sheet of an insulating dielectric material 54. The ground plane conductor as well as the dielectric member may be fabricated of a unitary metallic clad sheet material, such as for example Teflon impregnated Fiberglas or any of the paper phenolic laminated materials with a copper or other metallic backing. Utilizing printed circuit techniques a strip conductor member 56 is provided coextensively with the ground plane conductor 52. A spiral path 58 is provided adjacent to the terminal end of strip conductor 56 with the concentric turns 60 of a gradually reducing radius about a fixed reference axis. Since the printed circuit techniques provide for accurate control of the location of the spiral path, locating or centering means may be dispensed with in this configuration.

A dissipative material of the carbon or iron group of materials is deposited as a film 62 contacting the spiral path 58. The dissipation means will thereby be in contact with the turns 60 throughout the length to absorb the electromagnetic energy transmitted along the strip conductor 56.

Throughout the description of the present invention energy coupling means have been purposely omitted since the embodiment of the invention may be incorporated in existing microwave devices such as circulators, gyrators, duplexers and other components as well as transmission lines. It is well known in the art that coaxial connectors may be utilizing in coupling the ground plane and center strip conductors to any microwave transmission means.

The spiral path configuration of the strip conductor disclosed herein may be utilized without any impedance matching means such as transformers over relatively wide frequency bands and voltage standing wave ratios compatible with over-all system requirements have been demonstrated. By virtue of the compact size of the spiral strip conductor configuration termination devices for microwave transmission lines may be realized having an over-all length considerably shorter than prior art devices. In addition, numerous other resistive materials may be utilized for the dissipative members or film coatings to further enhance the energy absorption characteristics of the termination device. It is expressly understood that the invention including the numerous modifications and alterations described herein and evident to those skilled in the art is to be interpreted solely in accordance with the spirit and scope as set forth and defined in the appended claims.

What is claimed is:

1. In combination with a microwave transmission line system for propagating high frequency energy, a section of strip transmission line comprising:

a pair of outer parallel ground plane electrical conductors;

a center coplanar narow strip conductor intermediately disposed between said outer ground plane conductors;

said strip conductor defining adjacent to its terminal end a spiral portion of spaced concentracilly disposed circular turns of reducing radius about a fixed reference axis and gradually tapered substantially throughout the length of the spiral portion;

and means for dissipating said energy disposed in contact with opposing planar surfaces of said spiral portion and the outer conductors;

said dissipative means encompassing substantially all the area defined by said spiral portion.

2. In combination with a microwave transmission line system for propagating high frequency energy, a section of strip transmission line comprising:

a single ground plane electrical conductor;

a unitary narrow strip conductor;

a dielectric member interposed therebetween to maintain said conductors in a parallel spaced relationship;

said strip conductor defining adjacent to its terminal end a spiral portion of spaced concentrically disposed turns of reducing radius about a fixed reference axis and gradually tapered substantially throughout the length of the spiral portion;

and means for dissipating said energy deposited on said spiral portion and exposed surfaces of said dielectric member in the spaces between said turns.

3. A microwave energy attenuator comprising:

a section of strip transmission line having at least a single planar ground plane electrical conductor;

a narrow strip conductor spaced from said ground plane conductor by a dielectric material;

said strip conductor defining adjacent to its terminal end a spiral portion of concentrically disposed circular turns of reducing radius about a fixed reference axis;

said strip conductor further defining over substantially the length of said spiral portion a width dimension of gradually reducing value;

and microwave energy absorbing means disposed in contact with at least one planar surface of said spiral portion whereby a progressively increasing amount of said absorbing means is exposed to microwave energy propagated along said transmission line.

References Cited

UNITED STATES PATENTS

| | | | |
|---|---|---|---|
| 2,577,500 | 12/1961 | Arenberg | 333—22 |
| 2,725,535 | 11/1955 | Grieg et al. | 333—22 |
| 2,750,567 | 6/1956 | Burns et al. | 333—22 X |
| 2,803,805 | 8/1957 | Wilson. | |
| 2,909,736 | 10/1959 | Sommers et al. | |
| 3,022,472 | 2/1962 | Tanenbaum et al. | |
| 3,209,284 | 9/1965 | Hast | 333—22 X |
| 3,341,790 | 9/1967 | Candilis | 333—81 |

FOREIGN PATENTS

| | | |
|---|---|---|
| 632,834 | 12/1949 | Great Britain. |
| 862,311 | 3/1961 | Great Britain. |

OTHER REFERENCES

Torgow et al.: "Miniature Strip Transmission Line for Microwave Applications," IRE Transactions on Microwave Theory and Techniques, MTT-3, March 1955, number 2, pp. 57–64.

HERMAN KARL SAALBACH, Primary Examiner

W. H. PUNTER, Assistant Examiner

U.S. Cl. X.R.

333—81, 34, 84